(12) United States Patent
Bowes, Jr.

(10) Patent No.: US 6,427,293 B1
(45) Date of Patent: Aug. 6, 2002

(54) ADHESIVE MOUNTED DEVICE CLIP

(76) Inventor: James Bowes, Jr., 23 Newbury Neck Rd., Newbury, MA (US) 01951

( * ) Notice: Subject to any disclaimer, the term of this patent is extended or adjusted under 35 U.S.C. 154(b) by 0 days.

(21) Appl. No.: 09/625,424

(22) Filed: Jul. 25, 2000

(51) Int. Cl.[7] ............................. A44B 18/00; A45F 5/00
(52) U.S. Cl. ........................... 24/304; 24/3.12; 24/3.13; 24/66.1; 24/114.6; 248/205.3
(58) Field of Search ............................. 24/304, DIG. 11, 24/66.1, 114.6, 3.12, 3.13; 248/205.3, 309.4

(56) References Cited

U.S. PATENT DOCUMENTS

| | | | |
|---|---|---|---|
| 1,814,303 A | * 7/1931 | Finlay | ..................... 248/205.3 |
| 2,005,569 A | 6/1935 | Smith | |
| 3,016,224 A | 1/1962 | Hall | |
| 3,190,599 A | * 6/1965 | Margulis | ................. 248/205.3 |
| 3,309,052 A | 3/1967 | Borisof | |
| 3,409,257 A | * 11/1968 | Elm | ........................ 248/205.3 |
| 3,410,513 A | * 11/1968 | Wolf | ....................... 248/205.3 |
| 3,542,321 A | 11/1970 | Kahabka | |
| 4,756,498 A | * 7/1988 | Frye | ......................... 248/205.3 |
| 4,901,406 A | * 2/1990 | Shelby et al. | ................. 24/3.13 |
| 5,056,197 A | * 10/1991 | Cohen | .......................... 24/304 |
| 5,433,413 A | * 7/1995 | Adams | ..................... 248/205.3 |
| 5,481,784 A | 1/1996 | Sinaiko | |
| 5,520,031 A | * 5/1996 | Davidge | ....................... 24/304 |
| 5,540,367 A | * 7/1996 | Kauker | ........................ 24/3.13 |
| 5,832,910 A | * 11/1998 | Wolfrath et al. | ......... 248/205.3 |
| 5,864,925 A | * 2/1999 | McGee | ........................ 24/3.13 |

* cited by examiner

Primary Examiner—Victor Sakran

(57) ABSTRACT

An adhesive mounted device clip. In one embodiment a carabine styled clip is attached to an adhesive backed mounting foot by means of a strain relieving cord loop. The resulting assembly can permanently mount to any handheld electronic device, such as a cellular telephone (base object) by means of the adhesive backed mounting foot. The carabine clip can be used to attach the assembly to other secondary objects. Thus rendering the device attached to the secondary object. The strain-relieved connection allows for a range of free motion between the device and secondary object.

22 Claims, 4 Drawing Sheets

7

3

8

10

9

ADHESIVE MOUNTED DEVICE CLIP

CROSS REFERENCE TO RELATED APPLICATIONS

Not applicable.

BACKGROUND—Field

This invention relates to clips, in particularly, a method to affix a clip to an object that doesn't readily have provisions for a clip, or where existing clips provide limitations. This invention will be shown and described in respect to its use with a mobile or cellular telephone. This is only one of many useful applications of the invention.

BACKGROUND—Prior Art

Currently a number of adhesive backed clips are available for cellular telephones. The clip adheres to the back of the phone, providing a method for clipping the phone to a belt or other thin flat object. Also available are a variety of adhesive based post clips. These devices have a small post which is mounted to the back of the phone via an adhesive. This post mounts into a clip, which is worn on the belt. The post allows the phone to swing on the clip.

These phone clips do an adequate job of mounting a phone to the users belt. These designs fail when it comes to being able to clip the phone to the belt and later clip it to another object. These designs are specifically for belt mounting of the device. Quite often the user does not want to wear the phone on the belt, but putting it in a bag would make its use more difficult. By clipping it to the outside of the bag, the phone will not accidentally be left behind and the user will be able to hear it if it rings. The existing phone clips are inadequate in attaching to a variety of surfaces, including the outside of a bag.

Other styles of adhesive clips have also been developed. These inventions were simple in format and construction. The invention described by Borisof (3309052) is an effective solution for mounting a clip to a large fixed planer object, such as a wall. The Borisof device is limited in that it is designed to hold flat objects such as posters onto another flat object such as a wall. This design does not make provisions for clipping objects that are not flat.

The invention created by Hall (3016224), also focuses specifically on clipping to flat objects. The clasp in his invention is mounted directly to a flat adhesive disk. This device serves well with his specific application of clasping keys and flat objects, but falls short in any attempt to clip to a non flat object.

Another previously developed adhesive clip is that of Kahabka (354231), this device uses an adhesive backed clip to mount wiring. This invention does a good job of solving the specific issue of holding wires to a wall or other object. But it fails in its ability to provide any planer flexibility. Similar to Borisof and Hall, this invention requires that the wires being held by the device be in a similar orientation to that of the mounting surface.

Based on the need for a more versatile phone clip that would allow the user to easily clip the phone to a belt, to a bag, or hang the phone on a hook. The following invention was developed.

SUMMARY

In accordance with the present invention a clip is mounted to a mounting foot by means of a cord loop. The mounting foot it mounted to a device (base object) by means of an adhesive. Thus rendering the clip attached indirectly to the device (base object), and providing the clip a range of motion limited only by the length of the cord loop. Said range of motion allowing the clip to function in planes other than that of the mounting foot.

OBJECTS AND ADVANTAGES

Several objects and advantages of the present invention are:

(a) to provide a clip which can easily mount to the surface of any desired object;

(b) to provide a clip that allows flexibility with respect to the planes of the clipped object and the mounted portion of the clip;

(c) to provide a clip that can easily attach to a variety of different objects (d) to provides an economical solution to the mounting of a clip on a device that may not have any other means for attaching a clip (e) to provide a clip that allows the device to rotate and move freely, limited only by the length of the strain relief, with respect to the object that the clip is attached to.

(f) to provide a solution that allows the user to easily remove and replace the clip (g) to provides a solution that is easily compatible with all devices already in existence;

Further objects and advantages are to create a useful clip that can be used to attach a base object, which is generally portable and utilized in many different locations to a secondary object. With the provision that the clip can be permanently attached to the base object, but must attach and detach quickly and easily from the secondary object. Still further objects and advantages will become apparent from a consideration of the ensuing description and drawings.

DRAWING FIGURES

REFERENCE NUMERALS IN DRAWINGS

1. Mounting Foot
2. Double sided adhesive tape
3. Carabine Clip
4. Cord Loop/Strain Relief
5. Suspended Bar/Secondary Object
6. Cellular Telephone/Base Object
7. Spring Clip
8. Swivel Bolt Clip
9. Squeeze Clip
10. U-Clip
11. Mounting Hole 12. Swivel Mount
13. Locking Ring
14. Adhesive Ring

DESCRIPTION FIGS. 1,2,3,4

Figure 1:
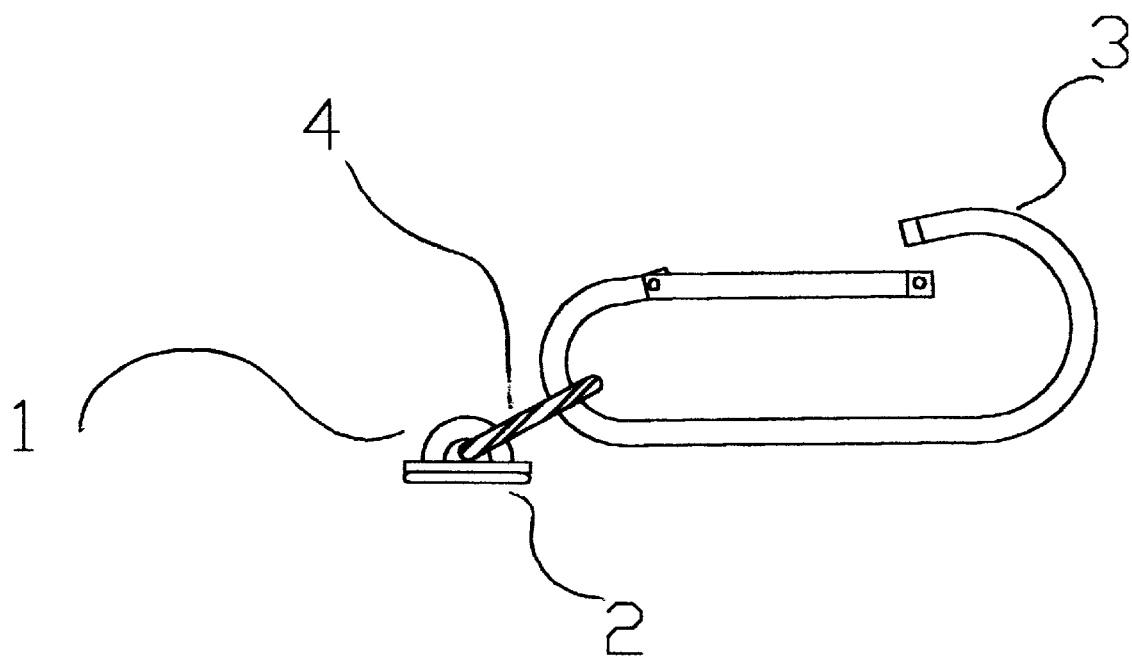
FIG. 1 is a view of the apparatus with a carabine styled clip.

FIG. 1 is a side view of one embodiment of the invention. Shown is Mounting Foot (1) attached to Carabine Clip (3) by means of Cord Loop/Strain Relief (4). Double Sided Adhesive Tape (2) is attached to the bottom of Mounting Foot (1), by removing the quickrelease liner, common on double sided adhesive tape, and attaching it to the bottom of the mounting foot. When the user is ready to adhere the invention to a surface, the quick release liner is removed from the exposed side of the double sided adhesive tape, which is then affixed with slight pressure to the desired surface.

Figure 2:
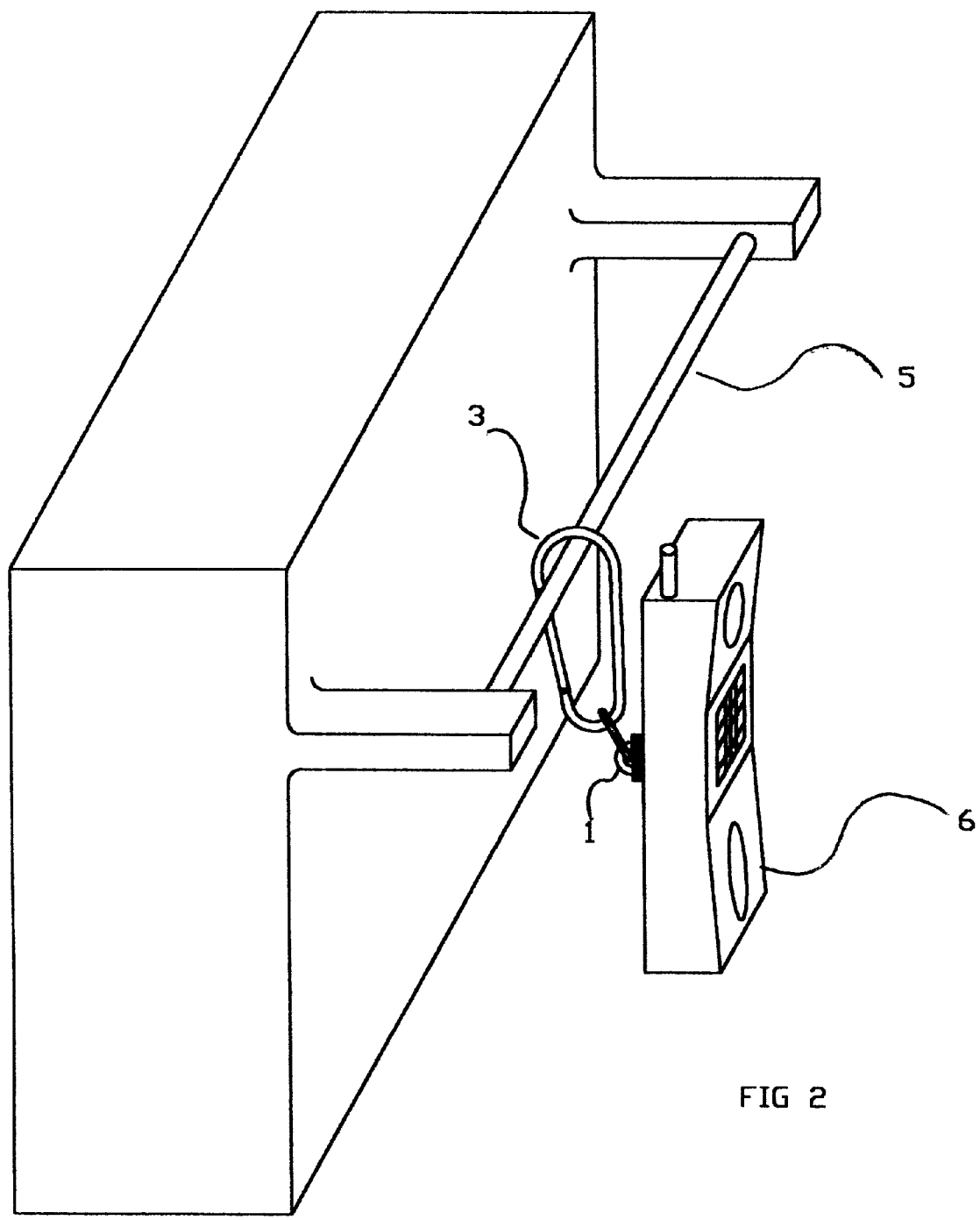
FIG. 2 is a view of the apparatus mounted to a cell phone and to a secondary object

FIG. 2 shows the invention adhered to a Cellular Telephone (6). The Carabine clip (3) portion of the invention is used to clip the invention to a secondary object, in this case a Suspended Bar (5). The result of the invention adhered to the Cellular Telephone and clipped to the suspended bar, is that the Cellular Telephone is now attached to the Suspended Bar.

Figure 3:
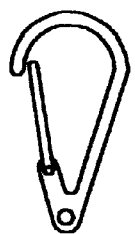
FIG. 3 shows a variety of other clip styles, suitable for use with this invention
Figure 3:
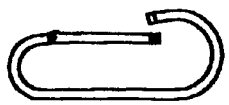
Figure 3:
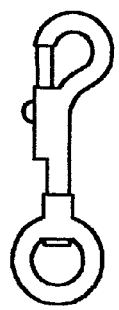
Figure 3:
Figure 3:
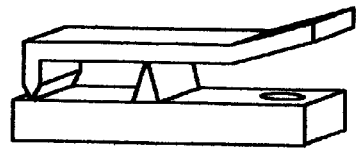

FIG. 3 shows a variety of clip styles that are included in the scope of this invention. The previously mentioned Carabine Clip (3) is shown. Spring Clip (7) functions in a similar fashion to the Carabine Clip. The Spring Clip can mount to the Mounting Foot by means of the hole at the base of the clip. The function of the invention would be identical to that of the carabine clip. Swivel Bolt Clip (8) also functions identical to the Carabine Clip. U-clip (10) can be attached to the mounting foot, and used to attach to a secondary object by sliding over a belt or other object of similar thickness. Squeeze Clip (9) can be used to attach the invention to object by means of loaded pressure from the clip.

Figure 4:
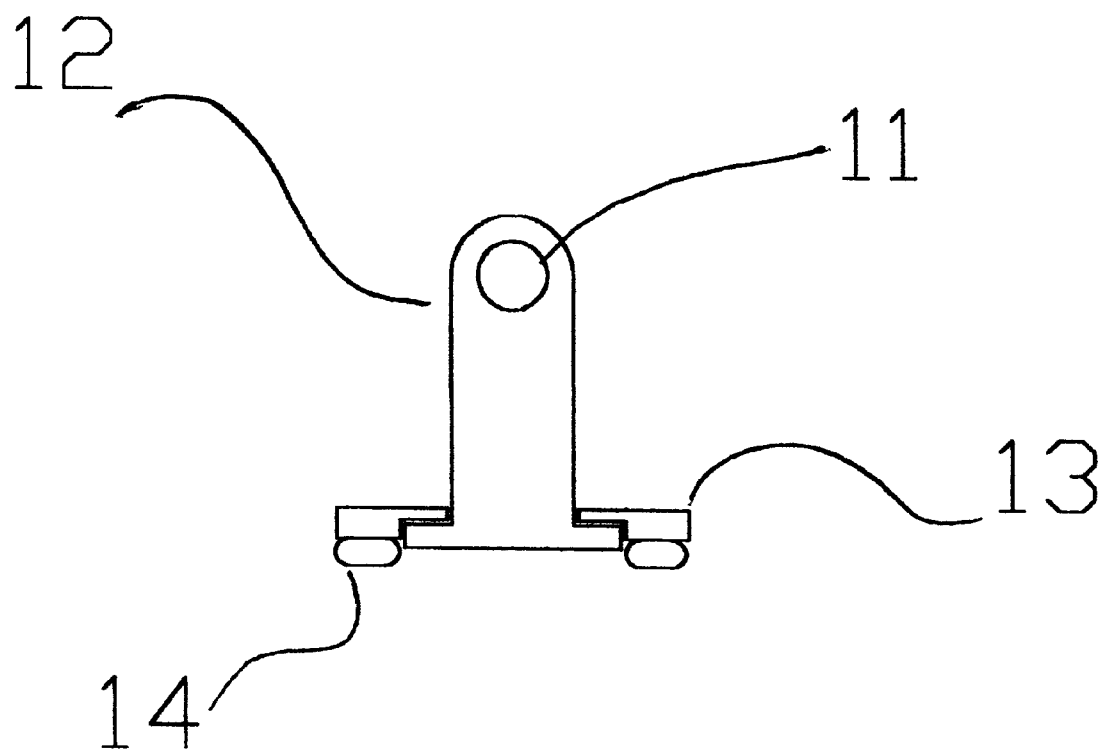
FIG. 4 shows an alternative mounting foot design that eliminates the need for the cord loop

FIG. 4 shows a variation of the Mounting Foot which eliminate the need to use an additional Cord Loop to attach to the clip. This variation allows for the clip to mount directly to Swivel Mount (12) by means of Mounting Hole (11). The Swivel Mount is attached to the Base object by means of Locking Ring (13) and Adhesive Ring (14). The Locking Ring sits over the base of the swivel mount. When the Locking Ring is adhered to the base object, the Swivel Mount is trapped between the base object and the Locking Ring. Since there is no adhesive on the bottom of the Swivel mount, and because it is concentric with the Locking Ring, it can spin freely. This spinning motion allows the attached Clip to rotate in relation to the Mounting Foot.

ADVANTAGES

From the description above, a number of advantages of the adhesive mounted clip device become evident.

A) By using an adhesive and a mounting foot, the invention can mount to almost any type of cellular telephone, mobile electronic item, or hand held device.

B) A variety of clips can be used to custom fit the invention to a particular application C) By creating a permanent attachment to the mobile item, the clip does not get separated from the device.

D) The use of a Cord Loop allows the device to swing freely in relation to whatever secondary object that the clip is attached to. This is important in that it allows a great deal of comfort, if the user is mounting it to his/her belt or some other piece of clothing. It is also important in that it allows the device to be clipped to secondary objects that may not have been designed with ease of clipping in mind. An example of this is using the invention to clip a cellular telephone to d-hook on a backpack. No existing clip will safely and effectively clip a cellular telephone to a d-hook.

OPERATION OF INVENTION

The Adhesive Mounted Device Clip is utilized by adhering the mounting foot (1, FIG. 1) to a device (base object) by means of an adhesive or adhesive tape (2, FIG. 1). Once mounted to the base object (6, FIG. 2), the operator can attach clip (3, FIG. 1) to a secondary object (5, FIG. 2), thus rendering the device (base object), "attached", to the secondary object.

The cord loop/strain relief (4. FIG. 1) that attaches the clip (3, FIG. 1) to the mounting foot (1. FIG. 1), allows the clip to swivel freely, without placing undue stress on the mounting foot.

CONCLUSION, RAMIFICATION, AND SCOPE

Accordingly, the reader will see that the use of adhesive mounted device clip can be used to conveniently attach mobile devices, such as cellular telephones, pagers, radios, etc . . . to a secondary object by means of a clip. The adhesive mounted device clip mounts to the device (base object) by means of the adhesive. The invention then mounts to a secondary object by means of the clip. By using the clip, the user can quickly and easily attach and detach the device (base object) from the secondary object. The Cord Loop/ Strain Relief that attaches the Mounting Foot to the clip allows for the device (base object) to have a wide range of motion in relation to the secondary object that it is clipped to. This motion allows for ease of use, and prevents undo pressure from being unintentionally applied to the adhesive, which could result in the adhesive being pulled off of the device(base object).

The use of the adhesive mounted device clip provides the user with a convenient and useful method for clipping mobile devices, such as cellular telephones to any desired surface. Particularly when the mobile device was not originally designed with provisions for clipping, and the desired object to clip to was not designed for the mounting of that particular type of device.

Furthermore, the Adhesive Mounted Device Clip has the additional advantages in that It can mount to any object It can attach to a wide range of objects It allows the user to quickly secure or release a device (base object) from a secondary object.

It prevents the clip from being separated from the device (base object)

It can attach by the adhesive to a large object, when the desire is to quickly attach a variety of smaller items to one larger item.

the scope of the invention should be determined not by the embodiment(s) illustrated, but by the appended claims and their legal equivalents.

I claim:

1. An apparatus for affixing a clip to a handheld electronic device by means of an adhesive mounting, said apparatus comprising a mechanical clip, a strain relief, and a mounting foot supporting an adhesive member, said clip capable of securely mounting to other secondary objects, said strain relief capable of fastening the clip to the mounting foot in a fashion that allows the clip to swing freely in relation to the mounting foot, said freedom of motion serves to prevent excessive strain from forming on the adhesive member when force is applied in dissimilar directions, said mounting foot containing provisions for mounting securely to the strain relief via adhesive means.

2. The apparatus of claim 1, where the strain relief is manufactured from a loop of string.

3. The apparatus of claim 1, where the strain relief is manufactured from a loop of cord.

4. The apparatus of claim 1, where the strain relief is manufactured from a pliable rubber.

5. The apparatus of claim 1, where the strain relief is manufactured from a pliable plastic.

6. The apparatus of claim 1, where the clip is a carabine styled clip.

7. The apparatus of claim 1, where the clip is a swivel bolt styled clip.

8. The apparatus of claim 1, where the clip is a spring styled clip.

9. The apparatus of claim 1, where the clip is a u shaped clip.

10. The apparatus of claim 1, where the clip is composed of a squeeze to open (alligator) styled clip.

11. The apparatus of claim 1, where the adhesive means is composed of a double sided adhesive tape.

12. The apparatus of claim 1, where the adhesive means is composed of a secondary applied glue.

13. The apparatus of claim 1, where the adhesive means is composed of mechanically fastening the mounting foot to the target object.

14. An apparatus for affixing a clip to a handheld electronic device by means of an adhesive mounting, said apparatus comprising a mechanical clip and a mounting foot supporting an adhesive member. Said clip capable of securely mounting to secondary objects. Said mounting foot constructed in a fashion that allows the clip to rotate 360 degrees in relation to its adhered position.

15. The apparatus of claim 14, where the clip is a carabine styled clip.

16. The apparatus of claim 14, where the clip is a swivel bolt styled clip.

17. The apparatus of claim 14, where the clip is a spring styled clip.

18. The apparatus of claim 14, where the clip is a u shaped clip.

19. The apparatus of claim 14, where the clip is composed of a squeeze to open (alligator) styled clip.

20. The apparatus of claim 14, where the adhesive means is composed of a double sided adhesive taped.

21. The apparatus of claim 14, where the adhesive means is composed of a secondary applied glue.

22. The apparatus of claim 14, where the adhesive means is composed of mechanically fastening the mounting foot to the target object.

\* \* \* \* \*